(12) United States Patent
Plotts et al.

(10) Patent No.: US 6,485,192 B1
(45) Date of Patent: Nov. 26, 2002

(54) OPTICAL DEVICE HAVING AN INTEGRAL ARRAY INTERFACE

(75) Inventors: Alan Edward Plotts, Harrisburg, PA (US); Edmund Joseph Haley, Dillsburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/419,443

(22) Filed: Oct. 15, 1999

(51) Int. Cl.⁷ .............. G02B 6/36; G02B 6/38
(52) U.S. Cl. .............. 385/75; 385/89; 385/71; 385/88; 385/92
(58) Field of Search .............. 385/60, 75, 71, 385/76–78, 88–94

(56) References Cited

U.S. PATENT DOCUMENTS

| | | | | |
|---|---|---|---|---|
| 5,073,045 A | * | 12/1991 | Abendschein | 385/90 |
| 5,104,243 A | * | 4/1992 | Harding | 250/227.11 |
| 5,109,453 A | * | 4/1992 | Edwards et al. | 385/90 |
| 5,155,784 A | * | 10/1992 | Knott | 385/88 |
| 5,212,754 A | * | 5/1993 | Basavanhally et al. | 385/88 |
| 5,214,730 A | * | 5/1993 | Nagasawa et al. | 385/59 |
| 5,231,685 A | * | 7/1993 | Hanzawa et al. | 385/84 |
| 5,242,315 A | * | 9/1993 | O'Dea | 439/577 |
| 5,419,717 A | * | 5/1995 | Abendschein et al. | 439/577 |
| 5,539,848 A | * | 7/1996 | Galloway | 385/89 |
| 5,611,013 A | * | 3/1997 | Curzio | 385/89 |
| 5,715,338 A | * | 2/1998 | Sjolinder et al. | 385/14 |
| 5,745,622 A | * | 4/1998 | Birnbaum et al. | 385/75 |
| 5,923,803 A | * | 7/1999 | Bunin et al. | 385/80 |
| 6,033,125 A | * | 3/2000 | Stillie et al. | 385/75 |
| 6,250,820 B1 | * | 6/2001 | Melchior et al. | 385/89 |
| 6,318,909 B1 | * | 11/2001 | Giboney et al. | 385/90 |

* cited by examiner

Primary Examiner—Brian Healy
Assistant Examiner—Scott A Knauss

(57) ABSTRACT

The present invention provides an optical component having an integral optical array interface formed along a mating face. The optical interface has an optical connector section extending from a front wall and a plurality of lead in surfaces also extending from the front wall adjacent to the optical interface.

15 Claims, 10 Drawing Sheets

OPTICAL DEVICE HAVING AN INTEGRAL ARRAY INTERFACE

BACKGROUND

This invention is related to optical devices and more particularly to an optical device having an optical array interface.

With the continued miniaturization of optical and optoelectronic components such as lasers and detectors, comes the ability to create dense optical and optoelectronic components on smaller substrates. This technology is currently being utilized to create smaller optoelectronic components such as transmitters, receivers, and transceivers having light source and detector devices for transmitting and receiving fiber optic signals. The transmitters, receivers and, transceivers typically have an electrical interface for passing electrical signals corresponding to the optical signals transmitted and received. As density is increased, the optical interconnection and alignment presents a problem in that, instead of aligning a single transmit fiber and a single receive fiber at the optical interface, it is necessary to align a plurality of fibers at the optical interface.

U.S. Pat. No. 5,125,849 shows a pair of optical connectors forming the optical interface of an optoelectronic device. Each of these optical connectors is adapted to receive a single fiber. A connector guide is provided and includes an apertured body for receiving a guide pin to position, align, or polarize a mating connector. A problem exists with this design in that the apertured bodies are separate from the optoelectronic component and therefore are only roughly aligned to the optical connectors by their position on the mounting structure or circuit board. Since the optical interface includes only two relatively large optical connectors each having a single fiber, a rough alignment is sufficient to establish a reliable optical interconnection. This design however would not be preferred for a relatively small arrayed optical interface. Because the rough alignment provided would not be precise enough to establish reliable optical interconnections in the array.

U.S. Pat. No. 5,091,991 shows an optical fiber connector with an alignment feature. This patent shows a transmitter and/or a receiver device having a pair of optical connectors similar to those of U.S. Pat. No. 5,125,849 described above. A transceiver adapter is provided to receive a plug and to align the plug relative to the transmitter and/or receiver device. As shown in FIG. 1, the adapter contains many parts including, a shroud, an alignment adapter, pins, and a yoke. Again, a problem exists in that this adapter provides rough alignment to a pair of relatively large single fiber connectors at the optical interface. Also, it is undesirable to have multiple parts for achieving a precise alignment.

U.S. Pat. No. 5,140,663 also shows an alignment device for an optical transceiver. This device also includes a latching beam mechanism having plug stops for the optical connector. Similar to U.S. Pat. No. 5,091,991, this patent teaches a multiple part alignment device having an adapter, a shroud, pins, and a latching mechanism for establishing alignment and for securing a plug to the transceiver device. This design would present similar problems as described above if utilized with a relatively small array optical interface.

SUMMARY

It is therefore an object of the invention to provide an optical interface for an optical electronic component which provides precision alignment to an array of optical signal lines while minimizing the number of parts to perform the alignment.

This and other objects are achieved by providing an optical component having an optical array interface wherein an optical connector portion is integrally molded into the optical component and adapted to have a plurality of light guides disposed in a single ferrule.

BRIEF DESCRIPTION OF THE DRAWINGS

The invention will now be described by way of example with reference to the accompanying figures of which.

DETAILED DESCRIPTION OF THE PREFERRED EMBODIMENTS

Figure 1:
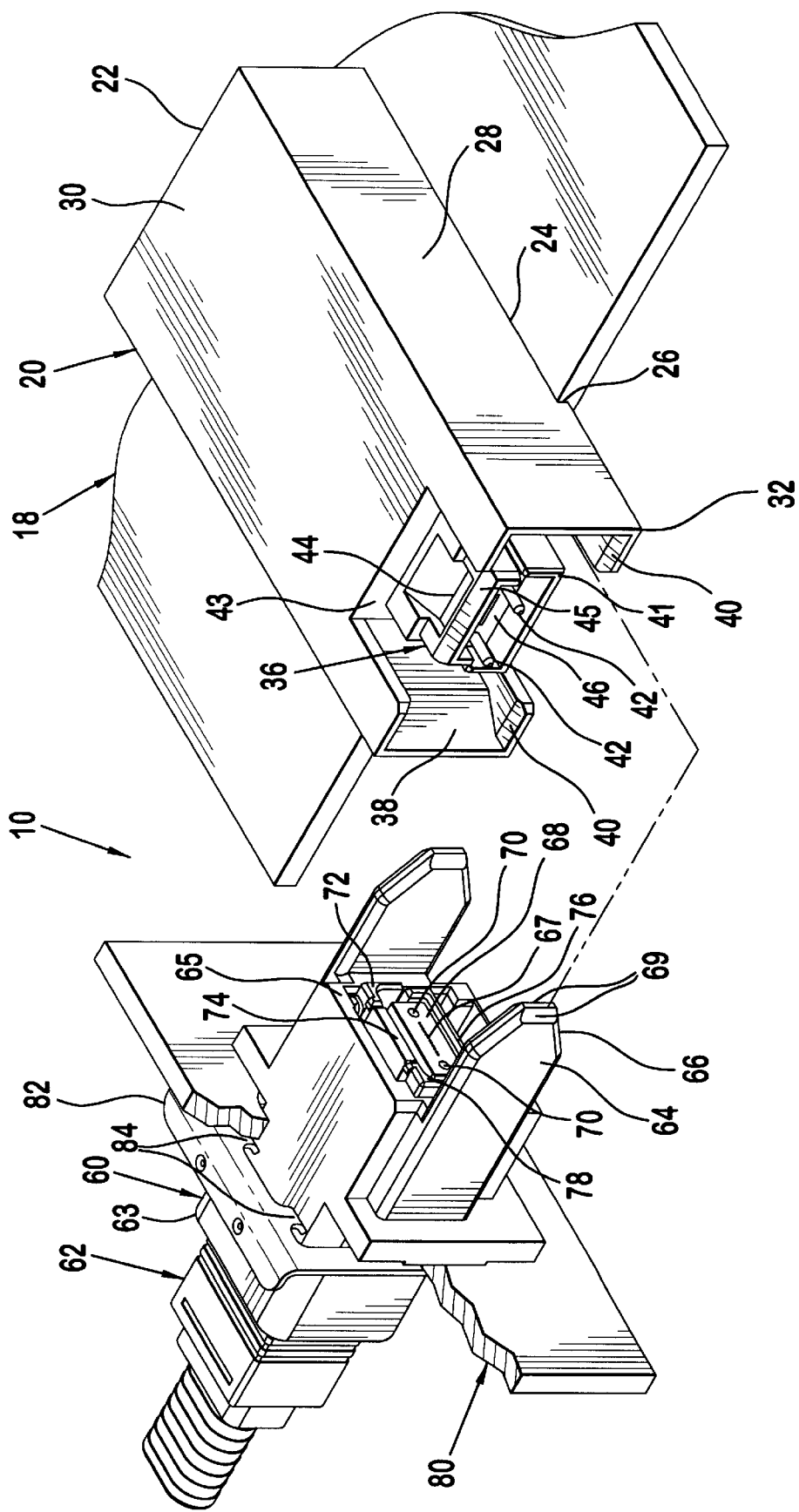
FIG. 1 shows a three-dimensional view of an opto electronic component and mating optical array connector.

The interconnection system 10 according to the present invention will first be described generally with reference to FIG. 1. An optical component 20 is mounted to a substrate 18.

The optical component 20 has connections to the substrate 18 and optical connector portion 36 along the mating face 32. The optical connector portion 36 is suitable for connecting a plurality of optical signals to the optical component 20. The mating connector assembly 60 features an optical connector 62 mounted in a coupling housing 63.

Each of the major components will now be described in greater detail with reference to FIGS. 1–3. Referring first to FIGS. 1 and 2, the optical component 20 may contain any combination of optical or opto electronic devices. For example the optical component 20 may be a transceiver containing light sources and light detectors or a Transmitter containing only light sources, or a receiver containing only light detectors. The optical component 20 may contain a plurality of passive optical devices or other active optical devices. The devices may be either opto electronic or purely optical in nature. The housing 22 contains the devices forming the optical component 20 and comprises a pair of opposed side walls 28 connecting the top wall 30 and a board mounting surface 24. Mating face 32 is disposed within the top wall 30, the side walls 28, and a board mounting surface 24. The optical connector portion 36 extends from within the housing 22 toward the mating face 32. The optical connector portion 36 features a first ferrule 46 for mounting a plurality of optical light guides 47 such as fibers. The light guides 47 extend to and couple with optical devises within the housing 22. The devises could optionally be mounted in place of the ferrule 46 and positioned to be directly matable with the mating connector assembly 60 which will be described in greater detail below. The first ferrule 46 is positioned within the optical connector portion 36 and is biased toward the mating face 32. A pair of alignment pins 42 extend from within the first ferrule 46 toward the mating face 32. It should be understood by those reasonable skilled in the art that the alignment pins 42 are optional and may be replaced by alignment openings or other suitable precision alignment features. The alignment pins 42 are precisely located with respect to the light guides 47.

A latching shoulder 44 is formed in a major surface of the optical connector portion 36. The optical connector portion 36 extends from a front wall 43. A narrow portion 45 extends around half of the optical connector portion 36 while a wide portion 41 extends around the other half. Lead in features are provided along inner surfaces of the side walls 28, the top wall 30, and the board mounting surface 24. A pair of vertical lead in surfaces 38 are provided along inner surfaces of each side wall 28. Horizontal lead in surfaces 40 are disposed along inner surfaces of both the top wall 30 and the board mounting surface 24. These lead in surfaces 38, 40 extend from the mating face 32 inward toward the front wall 43. Each of the lead in surfaces 38, 40 are tapered inward from the mating face 32 toward the front wall 43. An optional ledge 26 is provided along the board mounting surface 24 for properly registering the optical component 20 on the substrate 18. The ledge 26 may be removed so that the optical component 20 is mountable in the center of the substrate 18 or anywhere within the edges of the substrate 18 as shown in the alternate embodiment of FIG. 11 which will be described in greater detail below. In applications where the optical component 20 is mounted within the edges of the substrate 18, an optical cable assembly may be utilized to carry the optical signals to an edge of the substrate for mating with the mating connector assembly 60. The mating connector assembly 60 could optionally be part of a cable assembly and connected directly to an optical component 20 mounted within the substrate edges.

Figure 2:
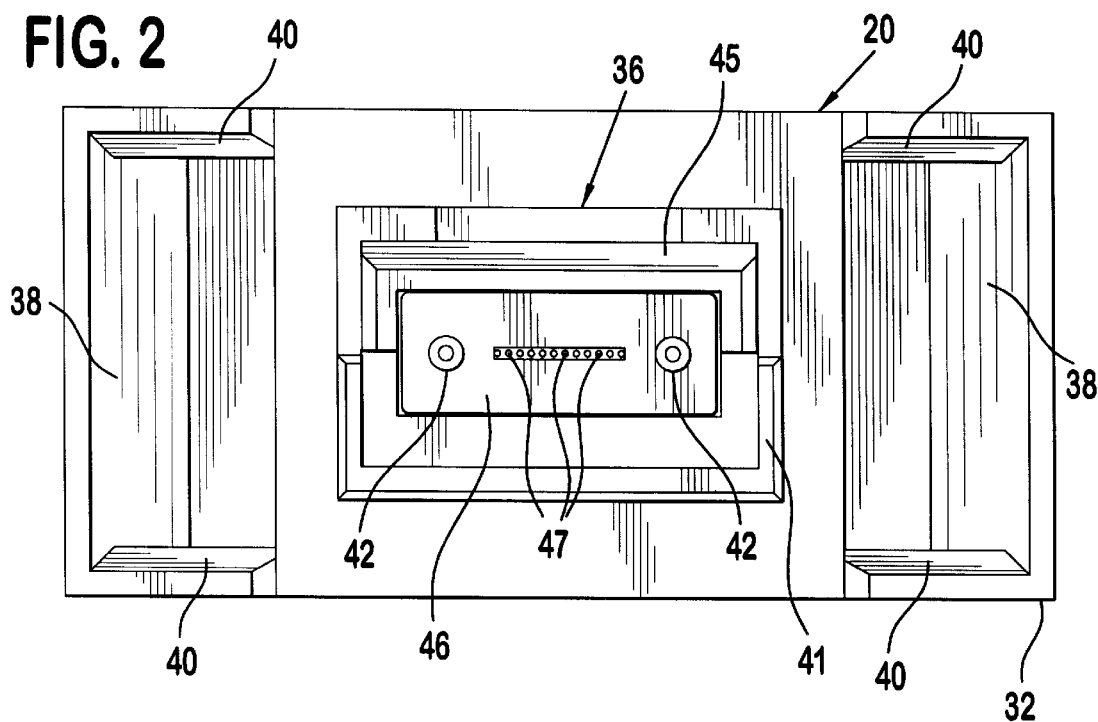
FIG. 2 shows and view of the opto electronic component of FIG. 1.
Figure 3:
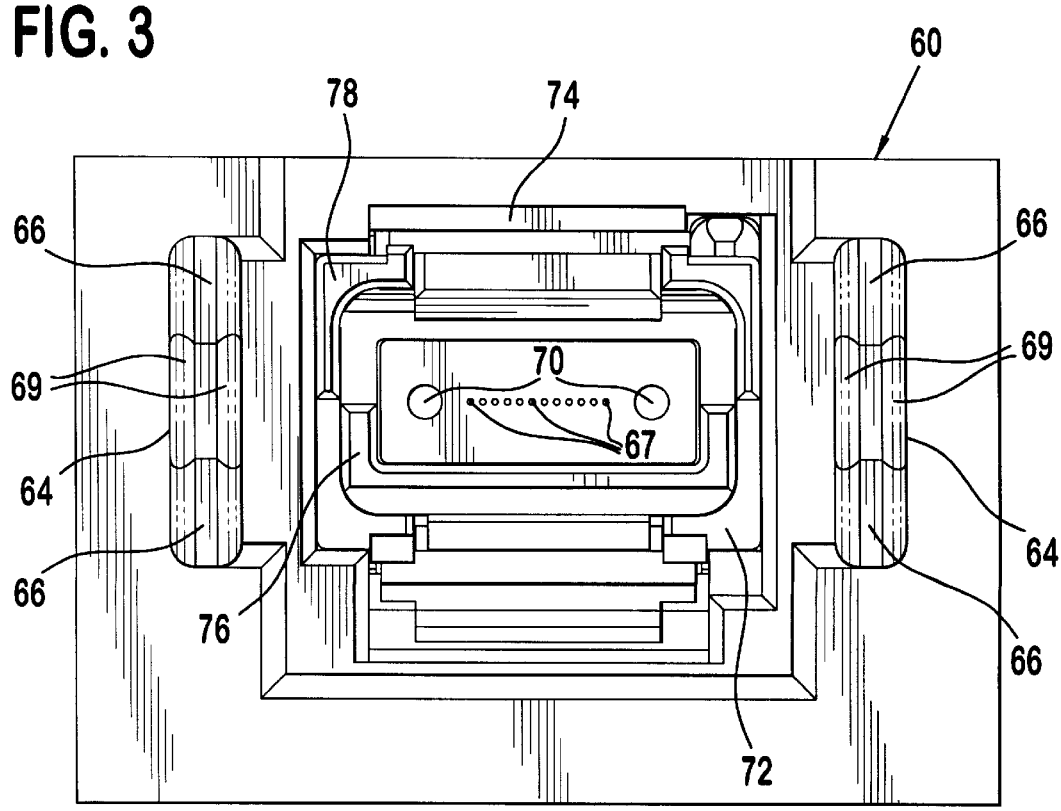
FIG. 3 shows an end view of the optical plug assembly of FIG. 1.
Figure 4:
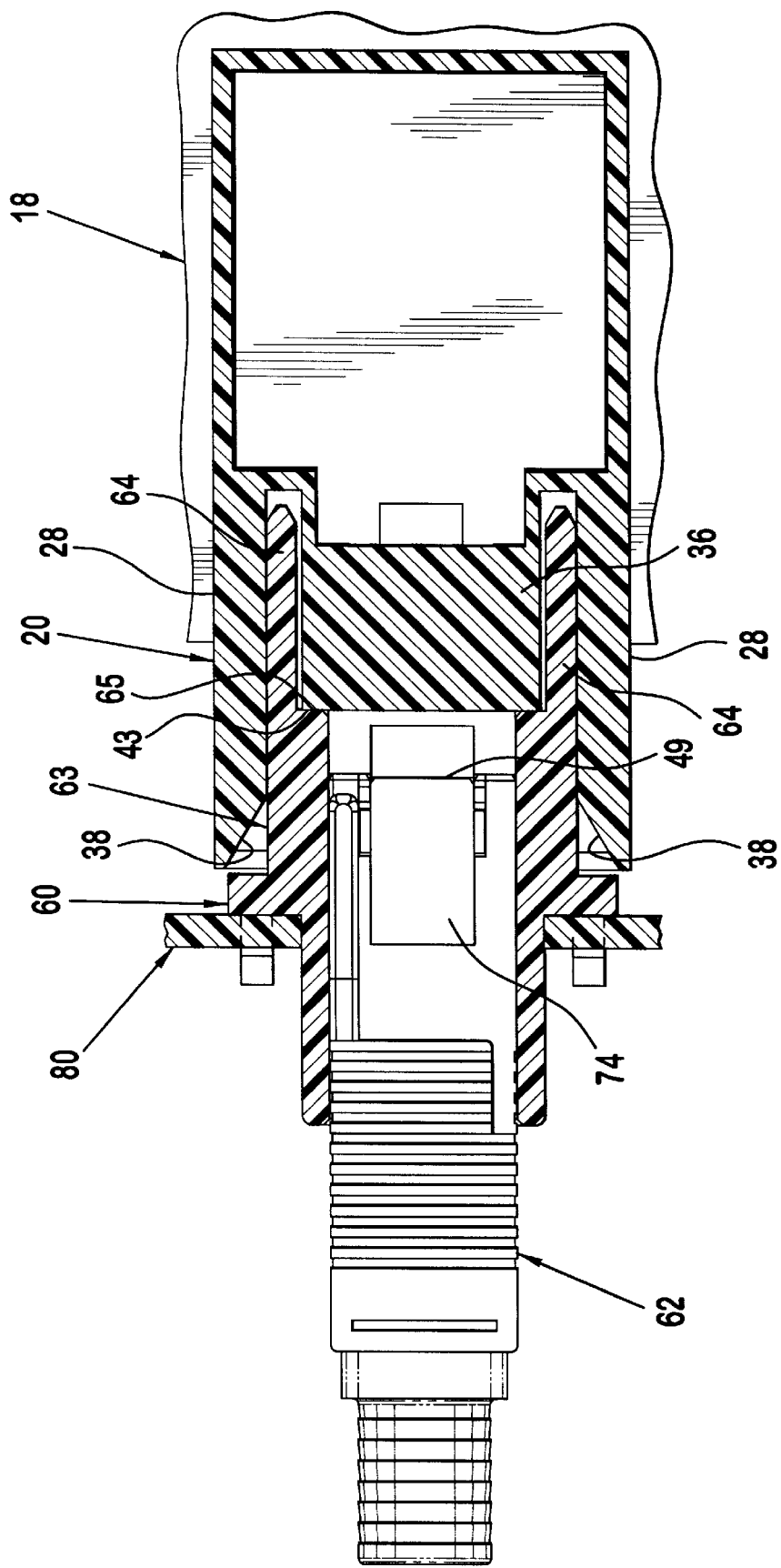
FIG. 4 shows a horizontal sectional view of the mated plug and opto electronic component assembly of FIG. 1.

Referring now to FIGS. 1 and 3, the mating connector assembly 60 will now be described in greater detail. The mating connector assembly 60 can utilize known optical connectors such as those shown in PCT publication WO 98/00741 and assigned to the assignee hereof. PCT publication WO 98/00741 is hereby incorporated by reference and should be referred to for a detailed description of the mating sequence for such connectors. An optical connector 62 is positioned in a coupling housing 63. The coupling housing 63 is optionally mountable to a substrate 80 such as a motherboard. The coupling housing 63 may be fixed to the substrate as shown in FIG. 4 or mounted within an opening of the substrate such that it floats within the opening as shown in FIG. 1. When mounted in an opening as shown in FIG. 1, a clip 82 is utilized for securing the housing 63 to the substrate 80. The substrate opening is larger than the outer dimensions of the housing 63 to allow some degree of float in directions normal to the mating direction. The clip 82 has a plurality of barbs 84 extending into engagement with the housing 63 and may be located at a small distance from the substrate surface to achieve additional float in the mating direction. Those reasonably skilled in the art would appreciate that there are several methods of accomplishing the desired degree of float within the substrate opening. The coupling housing 63 also features alignment projections 64 having vertical lead in sections 66 and horizontal lead in sections 69. The alignment projections 64 extend beyond the coupling mating face 65. The vertical lead in sections 66 extend from the alignment projections 64 at an angle toward each other. Horizontal lead in sections 69 are provided along opposing surfaces of the leading edge of the alignment projections 64 and along opposing surfaces of the vertical lead in sections 66.

The optical connector contains a second ferrule 68 for accommodating a plurality of light guides 67. A pair of alignment openings 70 is precisely located with respect to the light guides 67. It should be understood by those reasonably skilled in the art that the alignment openings 70 are optional and may be replaced by alignment pins or other suitable precision alignment features. The second ferrule 68 is movable within the optical connector 62 and is biased toward a connector mating face 72. The optical connector 62 has a complementary outer profile wherein a narrow portion 76 extends around half of the profile while a wide portion 78 extends around the other half. The optical connector 62 is releasable from the coupling housing 63. The latch 74 extends from the optical connector 62 toward the connector mating face 72. FIG. 4 shows a cross sectional view of the optical component 20 and the mating connector assembly 60 in a mated condition. It can be seen here that the alignment projections 64 of the coupling housing 63 are positioned between the side walls 28 and the optical connector portion 36. The mating face 65 of the coupling housing.63 abutts the front wall 43. Also, latch 74 is engaged with latching shoulder 44 and the optical connector 62 has been urged rearwardly to become unlatched from the coupling housing 63 while remaining latched to the optical device connector portion 36.

Figure 5:
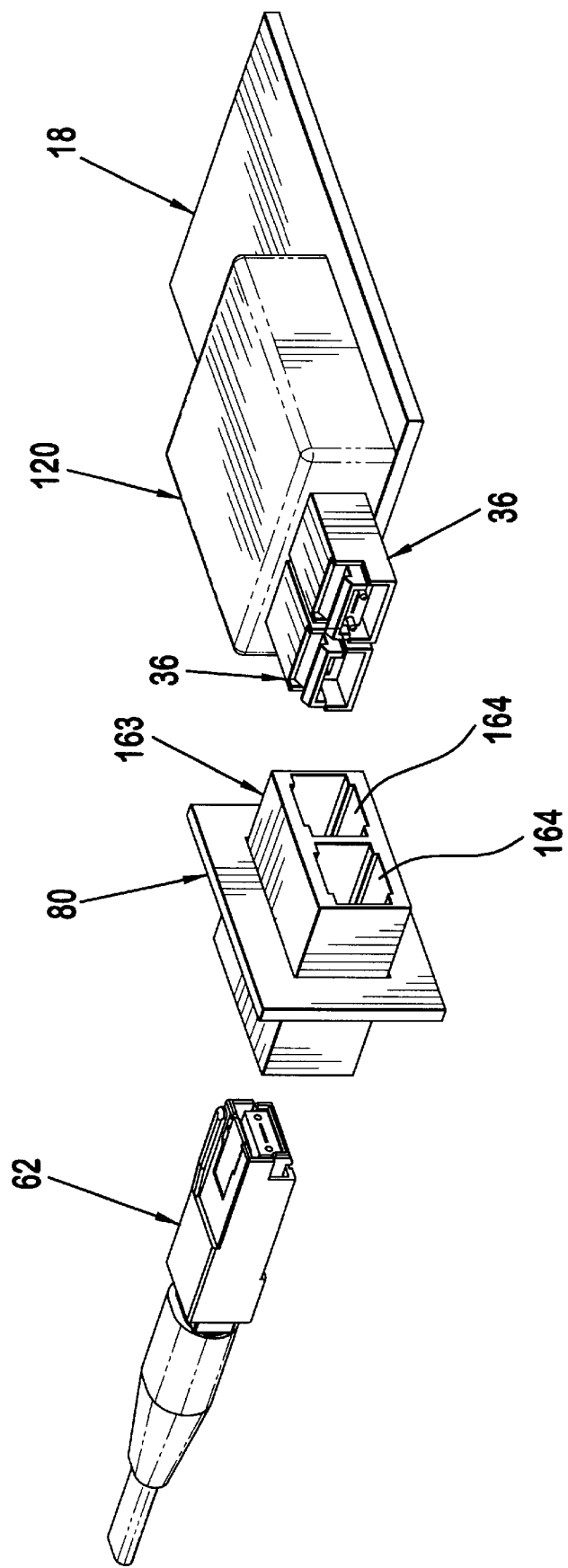
FIG. 5 shows a three-dimensional view of an alternate opto electronic component and mating optical array connector assembly.

FIG. 5 shows an alternate optical assembly 120 having a pair of optical connector portions 36. The optical connector portions 36 are each capable of holding a plurality of light guides 47. A suitable coupling housing 163 contains a pair of cavities 164 each for receiving an optical connector 62. It should be understood that this embodiment is presented to show multiple optical connector portions 36 being integrally formed into an optical component 120. Those reasonably skilled in the art will appreciate that while two connector portions 36 are shown here, larger numbers of interconnections could be achieved by utilizing more than two connector portions 36. Also, while the connector portions 36 are shown without lead in features 38, 40 as was described in FIG. 1, those reasonably skilled in the art would understand that these features could be optionally utilized with this embodiment.

Figure 6:
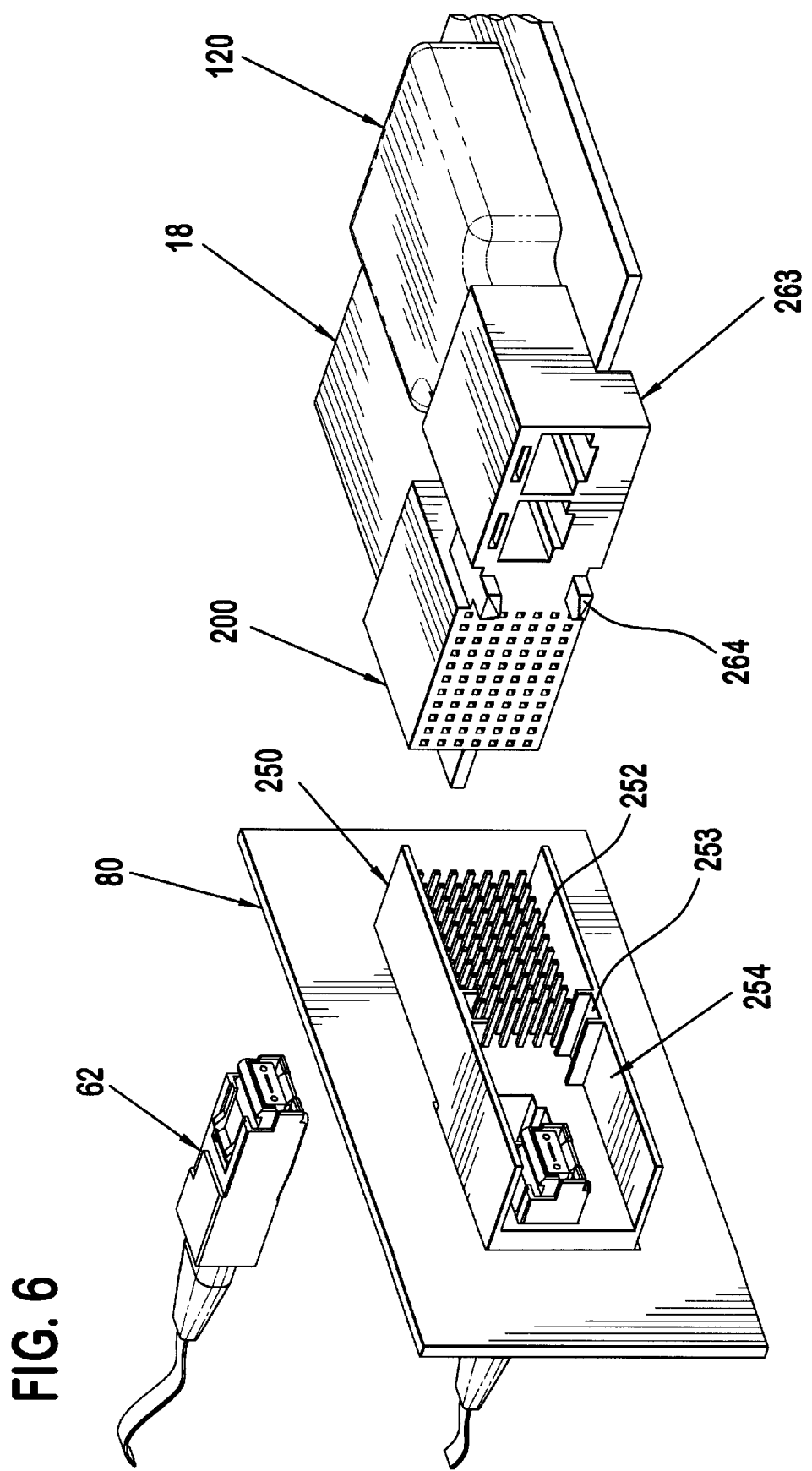
FIG. 6 shows a three-dimensional view of an alternate opto electronic component having a hybrid optical/electrical connector assembly.

FIG. 6 shows yet another alternate embodiment having an optical component 120 similar to that of FIG. 5 mounted on a substrate 18. The coupling housing 263 is combined with electrical connector portion 200 to create a hybrid electrical/optical interconnection. A pair of alignment posts 264 is provided between the coupling housing 263 and electrical connector portion 200. A complementary housing 250 includes a pin field 252 for mating with the electrical connector portion 200 and an optical coupling portion 254 for coupling to the coupling housing 263. The pair of alignment grooves 253 are positioned between the electrical connector portion 200 and the optical coupling portion 254. The optical coupling portion 254 is profiled to receive a pair of optical connectors 62.

Figure 7:
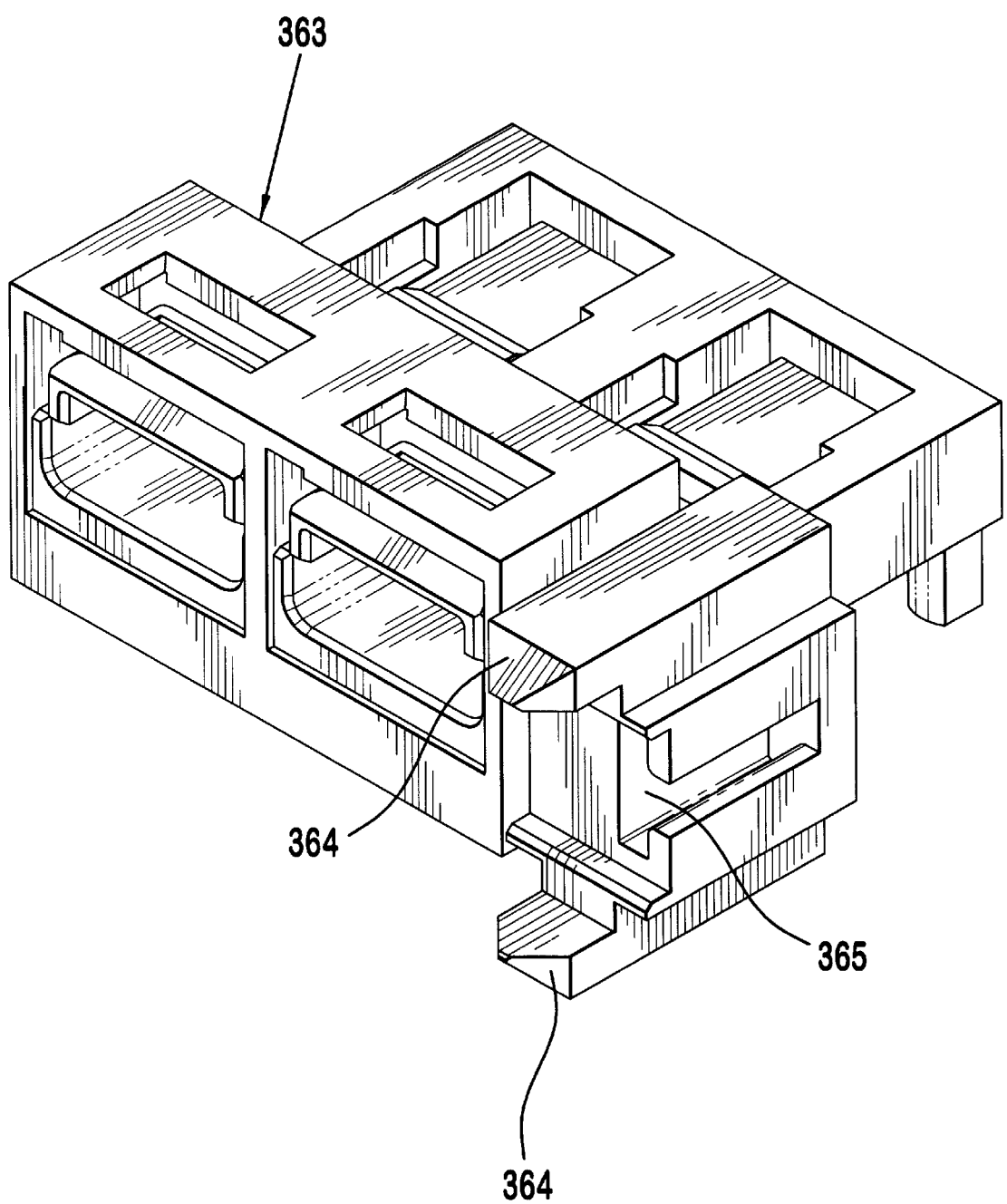
FIG. 7 shows a three-dimensional view of a modular opto electronic component mating portion.

FIG. 7 shows a modular coupling housing 363 which is useful for assembling hybrid interconnection systems such as the one shown in FIG. 6. This coupling housing 363 includes a slot 365 for receiving a projection of another modular sections such as either another coupling housing or electrical connector section. The alignment posts 364 are provided to function as the alignment posts 264 of FIG. 6.

Figure 8:
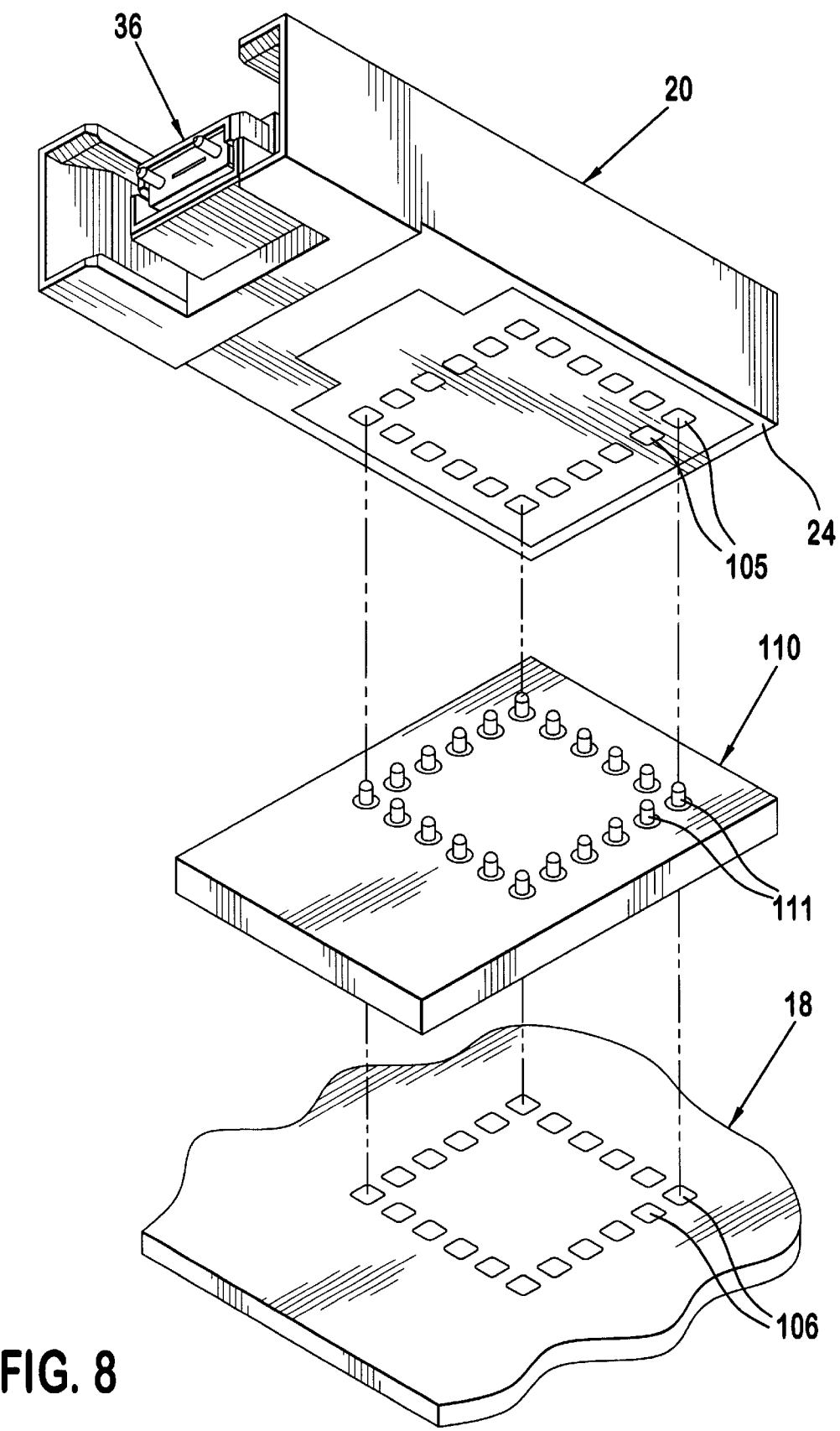
FIG. 8 shows a first electrical interface for the opto electronic component.
Figure 9:
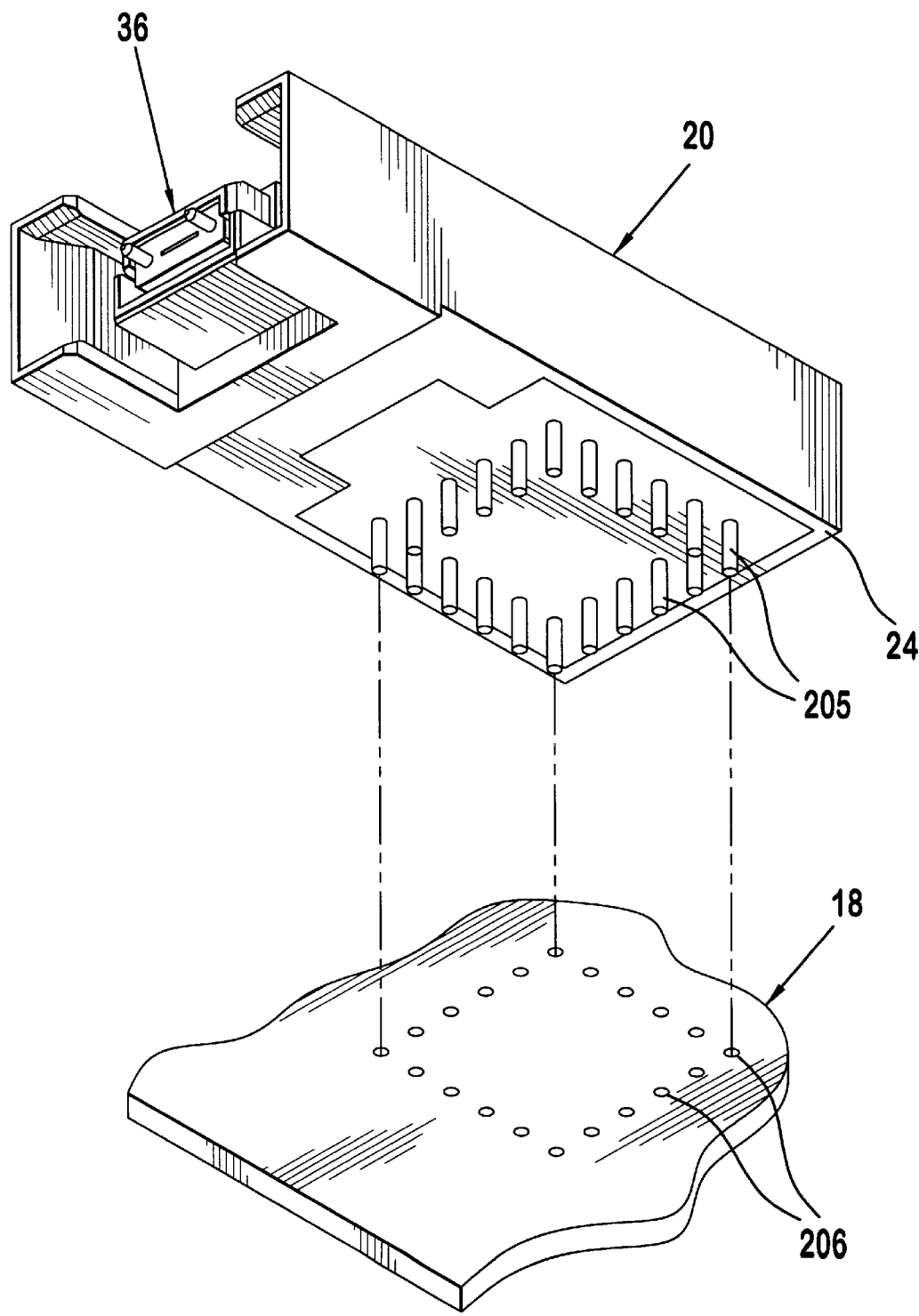
FIG. 9 shows a second electrical interface for the opto electronic component.
Figure 10:
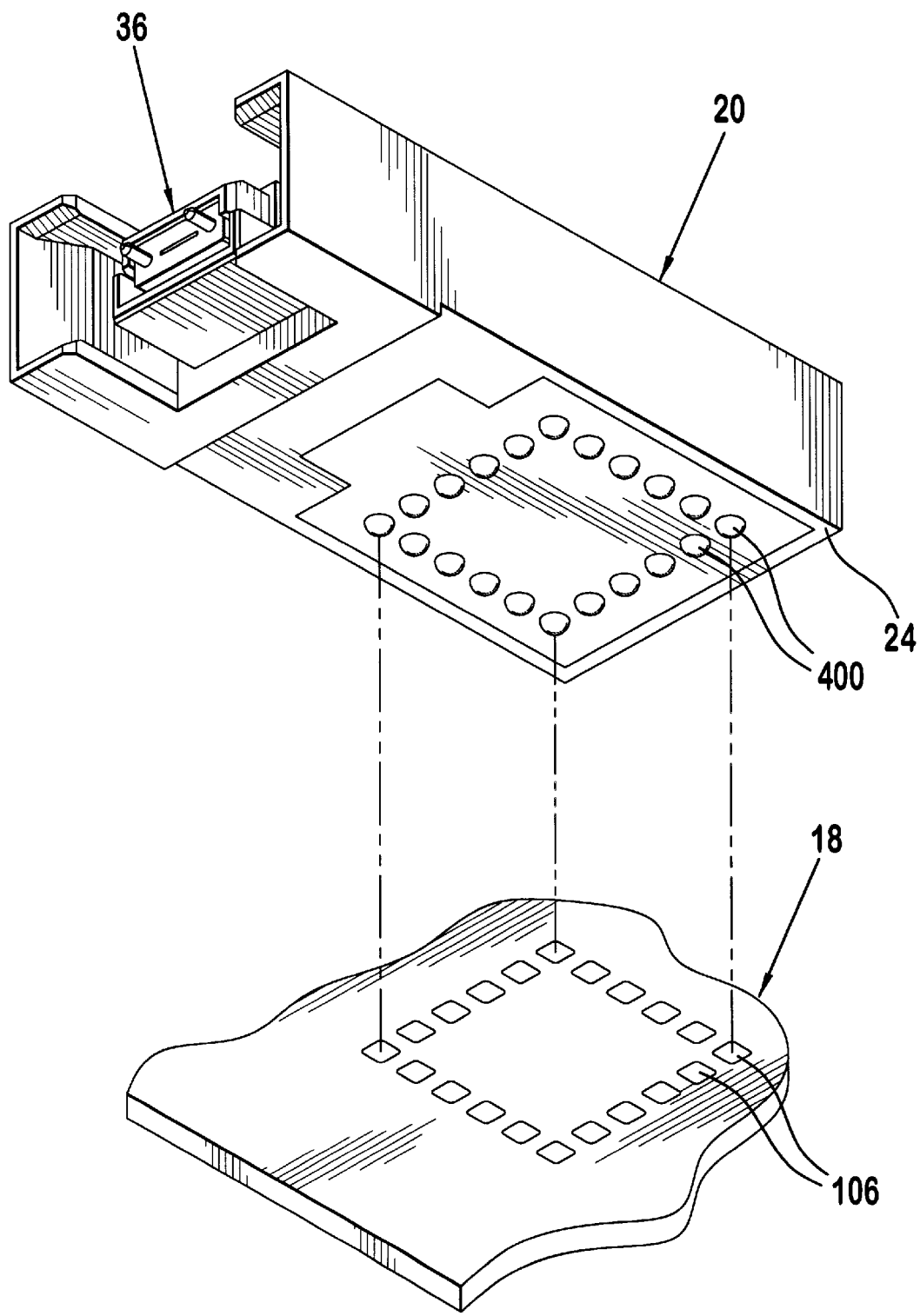
FIG. 10 shows a third electrical interface for the opto electronic component.

FIGS. 8, 9 and 10 show several electrical interfaces for the optical component 20 of FIG. 1. Turning first to FIG. 8, a land grid arrangement is shown. A plurality of pads or lands 105 is disposed along the board mounting surface 24 and connected to devices inside the optical. component 20. An interposer 110 is positioned between the optical component 20 and the substrate 18. Substrate 18 has a complementary series of lands 106 connected to traces on the substrate 18. The interposer 110 has a series of spring contacts 111 extending along opposing major surfaces and aligned with lands 105 and 106. The spring contacts 111 therefore form an electrical connection between lands 105 and lands 106. A suitable clamping device is utilized for securing the optical component over the interposer 110 and the substrate 18.

FIG. 9 shows a plurality of pins 205 extending from the board mounting surface 24 of the optical component 20. The pins 205 are similarly connected to devices inside the optical component 20. Through holes 206 are provided along the substrate 18 for receiving the pins 205. The through holes 206 are electrically connected to traces on the substrate 18 and the optical component may be secured to the substrate 18 by soldering the pins 205 in the through holes 206.

FIG. 10 shows a ball grid array arrangement. In this embodiment, the optical component 20 has a series of solder balls 400 disposed along the board mounting surface 24. The solder balls 400 are similarly connected to devices inside the optical component 20. Pads 106 are ranged along the substrate 18 to receive solder balls 400. The optical component 20 secured to the substrate 18 by re-flowing the solder balls over pads 106 to form an electrical connection between the optical component 20 and traces along the substrate 18 connected to pads 106. It should be understood that other electrical interfaces, either currently known or yet to be developed, could be adapted for use along the board mounting surface 24.

Figure 11:
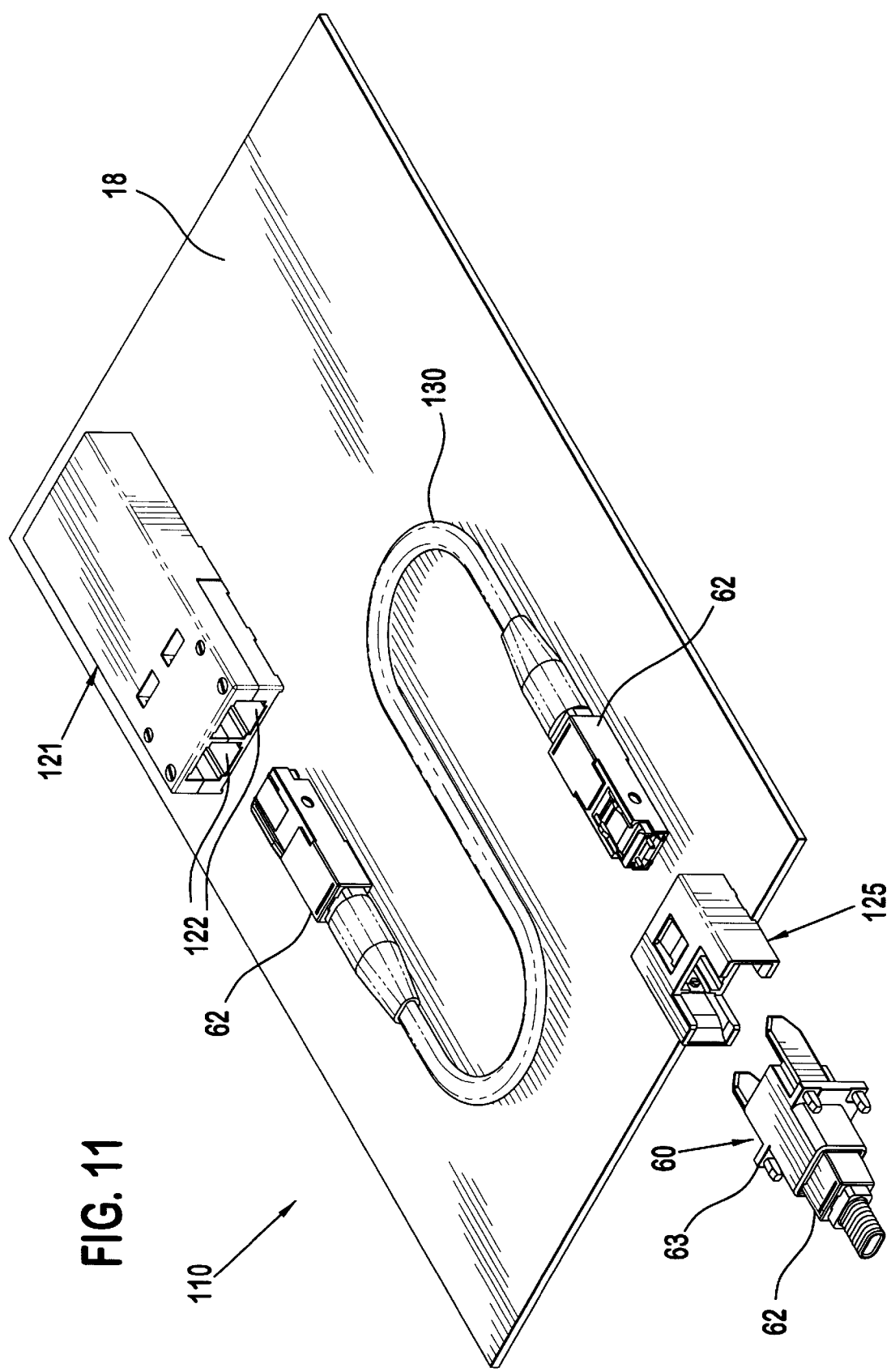
FIG. 11 shows a three-dimensional view of yet another alternate interconnction system.

FIG. 11 shows another alternate embodiment of the interconnection system 110. This embodiment differs in that the optical component 121 is mounted within the edges of the substrate 18. Mounting the optical component 121 within the edges of the substrate 18 requires an additional cable assembly 130 for carrying the optical signals to an edge of the substrate 18 for connection to the mating connector assembly 60. The mating connector assembly 60 is optionally mounted on a substrate 80 such as a motherboard. The optical component 121 also features a plurality of connector receiving passageways 122 as opposed to the single connector receiving passageway of the optical component 20. The cable assembly 130 consists of a pair of optical connectors 62 mounted at opposite ends of an optical cable. One optical connector 62 mates with the optical component 121 and the other optical connector 62 mates with the coupling housing 125 mounted along an edge of substrate 18. The coupling housing 125 is configured to mate with the mating connector assembly 60 similar to mating of the optical component 20 to mating connector assembly 60.

A mating sequence for the interconnection system 10 of FIG. 1 will now be described in greater detail. It should first be understood that the substrate 18 is generally a smaller component than the substrate 80 which is typically a motherboard or backplane assembly. The optical component 20 is therefore intended to be a removable sub assembly within a larger backplane assembly. Optional guide rails (not shown) may be provided along the substrate 80 for engaging edges of the substrate 18 to effect pre-alignment of two components 20, 60. Upon mating, initial engagement occurs between the alignment projections 64 and the lead in surfaces 38, 40. The horizontal lead in sections 69 first engage either the vertical lead in surfaces 38 or the horizontal lead in surfaces 40. Because the surfaces are all angled, further urging of the components toward each other causes the coupling housing 63 to move or float within the opening of the substrate 80. This connector float allows the two components 20, 60 to be aligned prior to forming the optical interconnection.

Next, the vertical lead in sections 66 engage the horizontal lead in surfaces 40. As the optical component 20 is further urged toward the mating connector assembly 60, the alignment pins 42 come into alignment with and enter the alignment openings 70. Finally, the latch 74 engages the latching shoulder 44 to secure the optical component 20 the mating connector assembly 60. This forms the optical interconnection between the optical component 20 and the mating connector 60. The optical connector 62 then becomes unlatched from the coupling housing 63 while remaining latched to the optical device connector portion 36 to complete the mating sequence. It should be noted here that the connector float feature shown in FIG. 1 is preferred but the mating connector assembly 60 may be alternatively hard mounted to the substrate 80 as shown in FIG. 4. In the case of a hard mount, either the substrate 80 or the substrate 18 is required to move relative to each other in order to achieve the alignment.

An advantage of the present invention is that when the optical component 20 is optionally mounted along a substrate edge, a plurality of optical interconnections is achieved within an optical component. A separate short optical cable assembly is not needed to connect the optical device which usually resides in the center of the substrate 18 to another connector housing which is placed on the edge of the substrate. Therefore manufacturing costs and the number of parts are reduced.

An additional advantage of the invention is that upon mating, the optical connector 62 becomes unlatched from the coupling housing 63 while remaining latched to the optical device connector portion 36. This allows a great deal of axial float so that the optical device 20 can coexist with other less precise electrical components on the same substrate 18. This allows the substrate 18 to move while still maintaining optical contact between the optical component 20 and the mating connector assembly 60.

Since the coupling housing 63 is optionally mountable to a board opening such that it could float within the opening, an additional advantage is that the substrate 80 could be blind matable with the substrate 18 because the alignment projections 64 serve to lead the coupling housing 63 into proper alignment with the connector portion 36 during mating.

What is claimed is:

1. An opto-electric package suitable for push/pull interconnection with a connector having at least one plug containing a plurality of optical waveguides and a latch, said opto-electric package comprising:

a housing having a front and back;

a plurality of opto-electric devices mounted in said housing; and a connector portion located at said front of said housing, said connector portion defining a cavity and having at least one shoulder, said connector portion being adapted to mate with said connector such that said cavity receives said plug and said shoulder interengages with said latch to define a mated condition between said connector portion and said connector, when said connector and said connector portion are in said mated condition, said optical waveguides are optically coupled with said opto-electric devices such that optical signals are transmittable therebetween.

2. The opto-electric package of claim 1, wherein said connector portion comprises alignment features which interact with alignment features on said connector.

3. The opto-electric package of claim 1, wherein said connector portion comprises a ferrule having fibers therein that optical couple to said opto-electric devices.

4. The opto-electric package of claim 1, wherein said connector portion comprises an optical component having a plurality of optical paths for optically coupling said optical waveguides of said connector with said opto-electric devices.

5. The opto-electric package of claim 1, wherein said opto-electric devices are mounted adjacent said connector portion such that, when said connector and said connector portion are in said mated condition, said waveguides are optically coupled with said opto-electric device directly without intermediate waveguides.

6. The opto-electric package of claim 1, wherein said opto-electric devices comprise a transmitter and a receiver.

7. The opto-electric package of claim 1, wherein said opto-electric devices comprise more than two opto-electric devices.

8. The opto-electric package of claim 1, wherein said connector is mounted to a backplane via an adapter and said opto-electric package is mounted to a system card.

9. The opto-electric package of claim 1, wherein said connector portion comprises lead-in features for receiving said connector.

10. The opto-electric package of claim 1, further comprising said connector.

11. The opto-electric package of claim 10, wherein said plug comprises a ferrule and said optical waveguides are fibers.

12. The opto-electric package of claim 11, wherein said ferrule is an MT ferrule.

13. The opto-electric package of claim 10, wherein said connector portion comprises a first ferrule and said plug comprises a second ferrule.

14. The opto-electric package of claim 13, wherein said ferrules are MT ferrules.

15. The opto-electric package of claim 10, wherein said connector comprises an inner housing slidably connected to an outer housing, said inner housing comprising said latch, wherein the relative sliding motion of said inner and outer housings causes said latch to be actuated.

* * * * *